N. P. PETERSEN.
MILK STRAINER.
APPLICATION FILED JULY 3, 1919.
1,332,358.
Patented Mar. 2, 1920.
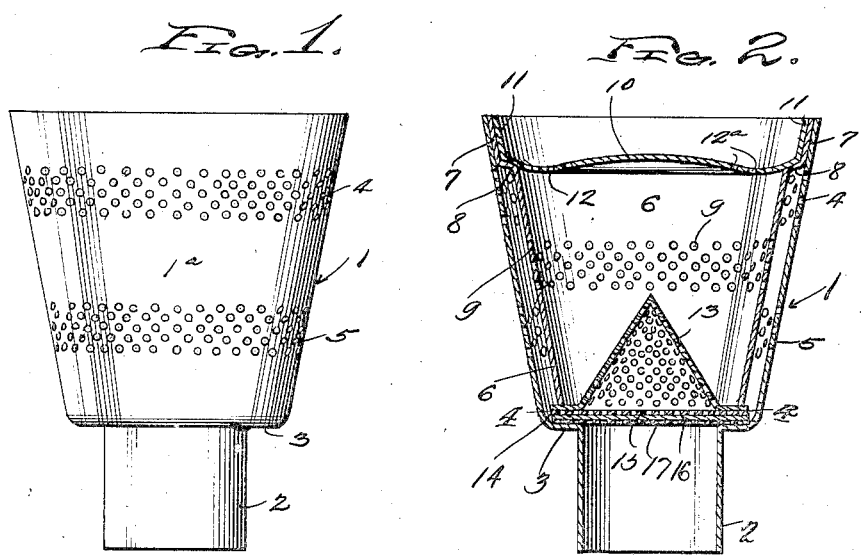
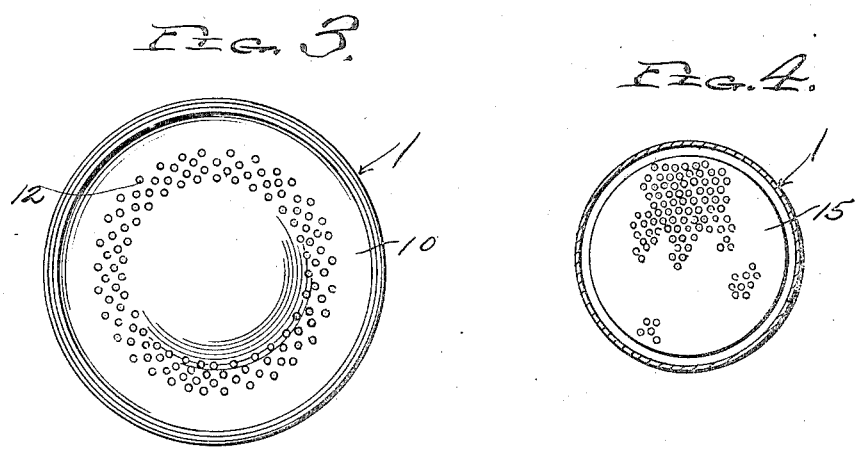
Witnesses
Inventor
Niels P. Petersen
By Richard Blewen,
Attorney

UNITED STATES PATENT OFFICE.

NIELS PETER PETERSEN, OF WEST LAFAYETTE, INDIANA.

MILK-STRAINER.

1,332,358.  Specification of Letters Patent.  Patented Mar. 2, 1920.

Application filed July 3, 1919. Serial No. 308,438.

*To all whom it may concern:*

Be it known that I, NIELS P. PETERSEN, residing at West Lafayette, in the county of Tippecanoe and State of Indiana, have invented certain new and useful Improvements in Milk-Strainers, of which the following is a specification.

This invention relates to liquid strainers, and more particularly to milk strainers.

The object of the invention is to provide a sanitary milk strainer which will aerate the milk in its passage therethrough and which may be easily and effectively cleaned.

Another object is to so construct such a strainer that all the parts may be quickly separated for cleaning and readily assembled when desired for use, and which has no seams to catch dirt.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a strainer constructed in accordance with this invention, Fig. 2 is a central vertical section thereof, Fig. 3 is a top plan view, and Fig. 4 is a horizontal section taken on the line 4—4 of Fig. 2.

In the embodiment illustrated, a hollow, truncated, cone-shaped outer casing 1 is shown, the smaller end of which merges into a cylindrical reduced extension 2 having a shoulder 3 formed at the junction thereof with said casing 1.

This casing 1 is provided with two series of vertically spaced perforations 4 and 5, any desired number of perforations being arranged in each series, and an imperforate portion 1ª forming a band between them.

An inner casing 6, also truncated cone-shaped in form is designed to be mounted in the casing 1 and is of less diameter than the outer casing to form an air space between the two when assembled, the outer end of this inner casing 6 being offset outwardly as shown at 7 to adapt it to fit snugly within the outer end of the casing 1 and the shoulder 8 is provided at the inner end of said offset portion to form a support for the cover 10 presently to be described. This casing 6 has a series of apertures 9 arranged around its periphery and positioned so as to be disposed opposite the band 1ª of the casing 1 when the parts are assembled so that the hot milk passing through the strainer will be thoroughly cooled and aerated by the air entering through the apertures 4 and 5 and sucked in through apertures 9 of the inner casing.

The cover 10 has an annular flange 11 designed to fit snugly against the inner face of the offset portion 7 of the inner casing 6, and said cover rests on the shoulder 8 of said casing when in operative position as is shown clearly in Fig. 2. This cover 10 has an annular depression 12 adjacent the flange 11 which is pierced with a plurality of apertures 12ª to permit the milk to pass through and to screen out larger particles of solid matter which might be contained in the milk.

A hollow pyramidal, finely perforated member 13 is designed to be mounted in the bottom of the strainer and has an annular outwardly extending flange 14 which passes under the lower end of the casing 6 and is clampingly held by said casing to support the strainer member 13 in operative position.

Between the flange 14 of the strainer 13 and the shoulder 3 of casing 1 are disposed two perforated metal plates 15 and 16 having a foraminous fabric disk 17 arranged between them and which are designed to strain out the small particles of dirt and the like.

From the above description it will be obvious that when the parts are assembled as shown in Fig. 2, the milk poured onto the top 10 will pass through the openings 12ª therein down onto the pyramidal strainer 13 and be distributed thereby onto the straining disks disposed below it and will pass out through the extension 2 into the can or other receptacle designed to receive it. This passage of the milk through the strainer will operate to suck in air through the apertures 4, 5 and 9 and thoroughly cool and aerate the passing milk.

When desired to clean the strainer, all that is necessary is to lift out the top 10, remove the inner casing 6 and then the strainer 13 may be lifted out and the disks 15 and 16 removed and separated from each other to provide for the removal of the straining fabric 17 which is preferably made of cotton or the like and may be renewed when found necessary.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A strainer of the class described comprising inner and outer radially spaced concentric members arranged one within the other with a straining element closing the bottom thereof, said members having aerating means for the liquid to be strained.

2. A strainer of the class described comprising inner and outer radially spaced concentric members arranged one within the other with a straining element closing the bottom thereof, one of said members having longitudinally spaced series of perforations and the other a series of perforations arranged to be positioned between the series of the other member when in assembled relation.

3. A strainer of the class described comprising inner and outer radially spaced concentric members arranged one within the other with a straining element closing the bottom thereof, said members having perforations therein arranged out of register with each other.

4. A strainer of the class described comprising inner and outer radially spaced concentric members arranged one within the other with a straining element closing the bottom thereof, said members having perforations therein arranged out of register with each other, and a cover for said inner member having perforations therein.

5. A strainer of the class described comprising inner and outer radially spaced concentric members arranged one within the other and perforated, the upper end of the inner member being offset outwardly and adapted to contact with the inner face of the outer member, a closure supported by said offset portion of the inner member and perforated to permit the passage of liquid therethrough, and a straining element mounted in the lower end between said members.

6. A strainer of the class described comprising inner and outer radially spaced concentric members arranged one within the other and perforated, the upper end of the inner member being offset outwardly and adapted to contact with the inner face of the outer member, a closure supported by said offset portion of the inner member and perforated to permit the passage of liquid therethrough, and a straining element mounted in the lower end between said members, said straining member being in the form of a perforated pyramid having an outwardly extending, lateral flange to be clamped between the lower ends of the inner and outer members.

7. A strainer of the class described comprising a hollow truncated cone-shaped outer casing with a cylindrical tubular extension at its smaller lower end with a shoulder at the front of said extension, a hollow truncated cone-shaped inner member arranged within the outer casing with its outer end offset to engage said casing, said casing members having perforations arranged out of register with each other, a top mounted within the offset portion of said inner casing and perforated for the passage of liquid therethrough, perforated straining disks arranged between the shoulder of the outer casing and the lower end of the inner casing, and a pyramidal, perforated strainer having a flange clamped between said disks and the lower end of said inner casing.

8. A strainer of the class described comprising inner and outer radially spaced truncated cone-shaped casings arranged one within the other, the outer end of the inner casing being offset outwardly and contacting with the inner face of the outer casing, a pyramidal strainer mounted in the bottom of said casings, and a closure mounted in the top thereof and having an annular perforated depression adjacent its perimeter.

In testimony whereof I affix my signature in presence of two witnesses.

NIELS PETER PETERSEN.

Witnesses:
 EDGAR G. COLLINS,
 THOS. N. ROSS.